US011720922B2

(12) United States Patent
Campeau

(10) Patent No.: US 11,720,922 B2
(45) Date of Patent: Aug. 8, 2023

(54) SENSOR TECHNOLOGY FOR IDENTIFYING AND ASSESSING STORE INVENTORY AND MERCHANDISING

(71) Applicant: SIX TWELVE TECHNOLOGIES, Chicago, IL (US)

(72) Inventor: Michael Campeau, Chicago, IL (US)

(73) Assignee: SIX TWELVE TECHNOLOGIES, Chicago, IL (US)

( * ) Notice: Subject to any disclaimer, the term of this patent is extended or adjusted under 35 U.S.C. 154(b) by 489 days.

(21) Appl. No.: 16/988,260

(22) Filed: Aug. 7, 2020

(65) Prior Publication Data
US 2021/0042790 A1 Feb. 11, 2021

Related U.S. Application Data

(60) Provisional application No. 62/884,497, filed on Aug. 8, 2019.

(51) Int. Cl.
G06Q 30/02 (2023.01)
G06Q 30/0251 (2023.01)
G06Q 10/087 (2023.01)
G06Q 30/0601 (2023.01)
G06K 7/10 (2006.01)
G06K 7/12 (2006.01)

(52) U.S. Cl.
CPC ..... *G06Q 30/0259* (2013.01); *G06K 7/10564* (2013.01); *G06K 7/12* (2013.01); *G06Q 10/087* (2013.01); *G06Q 30/0261* (2013.01); *G06Q 30/0643* (2013.01)

(58) Field of Classification Search
CPC ............. G06Q 30/0259; G06Q 10/087; G06Q 30/0261; G06Q 30/0643; G06K 7/10564; G06K 7/12

USPC ......................................................... 235/385
See application file for complete search history.

(56) References Cited

U.S. PATENT DOCUMENTS 10,062,008 B2 8/2018 Heusch et al.
10,324,186 B1 6/2019 Dagley et al.
(Continued)

FOREIGN PATENT DOCUMENTS

JP 5364386 B2 12/2013

OTHER PUBLICATIONS

International Application No. PCT/US2020/045375, International Search Report and Written Opinion, dated Nov. 17, 2020.

*Primary Examiner* — Daniel A Hess
(74) *Attorney, Agent, or Firm* — Marshall, Gerstein & Borun LLP

(57) ABSTRACT

Systems and methods for tracking the sales of products and presence of advertising materials within a physical store are provided. According to certain aspects, a sensor component disposed within the physical store may detect light emitted by a unique product identifier (UPI) affixed to a product. A processor of the sensor component may analyze the detected light to determine the UPIs, generate a digital representation of the UPIs within a field of view, and transmit at least a portion of the digital representation to a server computer. A plurality of sensor components may track the movement and sales of various products and presence of advertising materials in the physical store, and the server computer may analyze the resulting data to improve merchandising and the sales experience for customers, among other benefits.

18 Claims, 5 Drawing Sheets

(56) References Cited

U.S. PATENT DOCUMENTS

| | | |
|---|---|---|
| 10,325,375 B2 | 6/2019 | Araujo Dos Santos |
| 10,558,966 B2 | 2/2020 | Fitzsimmons et al. |
| 10,599,901 B2 | 3/2020 | Decoux |
| 10,682,877 B2 | 6/2020 | Schmid et al. |
| 10,776,746 B2 | 9/2020 | Stanarevic et al. |
| 10,783,601 B1 | 9/2020 | Rodriguez et al. |
| 10,787,019 B2 | 9/2020 | Mundy |
| 2008/0048106 A1* | 2/2008 | Blanchard ............ G07D 7/1205 250/363.01 |
| 2008/0055084 A1 | 3/2008 | Bodin et al. |
| 2017/0148077 A1 | 5/2017 | Phillips et al. |
| 2017/0186077 A1 | 6/2017 | Srinivasan et al. |
| 2019/0226990 A1* | 7/2019 | Reinhardt ............ G07D 7/1205 |

* cited by examiner

SENSOR TECHNOLOGY FOR IDENTIFYING AND ASSESSING STORE INVENTORY AND MERCHANDISING

CROSS-REFERENCE TO RELATED APPLICATIONS

This application claims the benefit of U.S. Provisional Patent Application No. 62/884,497, filed on Aug. 8, 2019, which is hereby expressly incorporated by reference in its entirety.

FIELD

The present disclosure is directed to various components and technologies to identify products within a physical store. More particularly, the present disclose is directed to platforms, components, and techniques for identifying products in stores, and tracking or detecting sales of the products.

BACKGROUND

Sales in physical retail stores account for more than $15 trillion dollars in annual sales globally, even with the growth over the last few decades of e-commerce sales channels. One of the primary differences between e-commerce and physical retail is the availability of quality data. In particular, an e-commerce operation enjoys having complete control over many aspects of the shopping experience, such as what the customer sees, the mix of offerings presented, and pricing. Furthermore, as e-commerce operations exist within computer systems where digital data is inherent, accessing such data is comparably easy. In contrast, it is difficult or impossible for physical retail stores and associated entities to access comparable data. In particular, some data may be difficult and costly to obtain due to the use of incompatible systems (e.g., a manufacturer wanting pricing data from thousands of independent retailers, each using one of many possible point-of-sale (POS) systems that record data in different conventions or formats). Other data may not be accurate due to human error (e.g., if a cashier incorrectly scans items during a transaction, thus entering incorrect information into the system). Finally, the amount of products or items in any given store at any given time is not known or ascertainable.

Conventionally, manufacturers of products sold at retail rely on an expensive sales representatives deployed across wide geographies to ensure that customers receive the correct brand message and value. These sales representatives may collect data to provide some insight into retail conditions for marketers and managers. However, the data collected is very limited, as a sales representative may visit a location once a month (or less) and for only a short amount of time. Further, due to time limitations, the amount of data collected is limited and may only entail answers to a few distinct "yes or no" questions. Moreover, this data has no means of validation and may be subject to human error. Accordingly, the absence of abundant, accurate, and easily-used data from retail stores causes many problems for retailers and manufactures alike. For example, the global cost of lost sales due to out-of-stock items is estimated to be more than a trillion dollars annually globally.

Accordingly, there is an opportunity for platforms and techniques for accurately, effectively, and efficiently collecting and processing information associated with the placement, access, and sales of products and items at physical stores.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In an embodiment, a computer-implemented method of identifying products by a sensor component is provided. The method may include: emitting, by a set of light sources disposed on the sensor component, light in a frequency corresponding to an absorption frequency of a marking applied to a product; detecting, by a digital sensor, additional light emitted, in an emission frequency, by the marking applied to the product, wherein the additional light passes through a band-pass filter; analyzing, by a computer processor, the additional light detected by the digital sensor to identify an identifier corresponding to the product; and generating, by the computer processor, a digital representation of the identifier corresponding to the product.

In another embodiment, a sensor component for identifying products is provided. The sensor component may include: a set of light sources configured to emit light in a frequency corresponding to an absorption frequency of a marking applied to a product; a band-pass filter configured to pass light having a range of frequencies; a digital sensor configured to sense additional light passed through the band-pass filter, wherein the additional light is emitted, in an emission frequency within the range of frequencies, by the marking applied to the product; and a processor interfaced with the digital sensor and configured to: analyze the additional light detected by the digital sensor to identify an identifier corresponding to the product, and generate a digital representation of the identifier corresponding to the product.

In a further embodiment, a system for identifying products for sale in a store is provided. The system may include: a sensor component configured to: emit light in a frequency corresponding to an absorption frequency of a set of markings applied to a set of products, detect additional light emitted, in an emission frequency, by the set of markings applied to the set of products, analyze the additional light to identify a set of identifiers corresponding to the set of products, generate a digital representation of the set of identifiers corresponding to the set of products, and transmit at least a portion of the digital representation to a server computer. The system may further include the server computer configured to: receive, from the sensor component, at least the portion of the digital representation, and determine the set of products from at least the portion of the digital representation.

BRIEF DESCRIPTION OF THE FIGURES

The figures described below depict various aspects of the system disclosed herein. It should be understood that each figure depicts an embodiment of a particular aspect of the disclosed system, and that each of the figures is intended to accord with a possible embodiment thereof. Further, wherever possible, the following description refers to the reference numerals included in the following figures, in which features depicted in multiple figures are designated with consistent reference numerals.

DETAILED DESCRIPTION

Currently, common implementations for collecting various data and information associated with the sale of products in physical stores rely on image recognition software, which is generally processor-intensive, slow, inaccurate, and requiring of large quantities of image data to be transmitted, stored, and processed. Additionally, the resulting data is often inaccurate and incomplete, and expensive to analyze. Examples of current offerings and applications in use are Trax Retail and Amazon Go retail locations. Trax Retail offers a service to consumer packaged goods (CPG) manufacturers in which a camera is installed at retail, or sales representatives capture images of products and merchandising on a periodic basis (e.g., monthly or weekly). The items depicted in the image are identified through image recognition software, with or without human assistance. Because a single image may not contain enough information for identification, a human is sometimes used to manually identify products.

Similarly, Amazon Go uses image recognition software to identify products on the sales floor, but generally analyzes the data in rear-real-time or real-time, which is expensive and requires extensive hardware and processing power. Further, the data processing only results in identification of a stock keeping unit (SKU) of a product, and not any additional data that may be unique to the particular package, item, or product. Additionally, Amazon Go uses a multitude of cameras in order to view products from many angles, thereby increasing the amount of data that must be analyzed to identify products and sales activity. Amazon Go stores thus have a reduced SKU count to accommodate these limitations, which reduces options for consumers and leads to a less desirable shopping experience. Introducing new products and/or new packaging can also be problematic, as the system needs to enter and learn the new data and information. Moreover, to maintain the many cameras directed at specific angles, several technicians are needed to operate and manage a store. By contrast, a traditional retail location having the same sized sales floor may offer three times the amount of unique product offerings and be managed by one or two employees.

Figure 1:
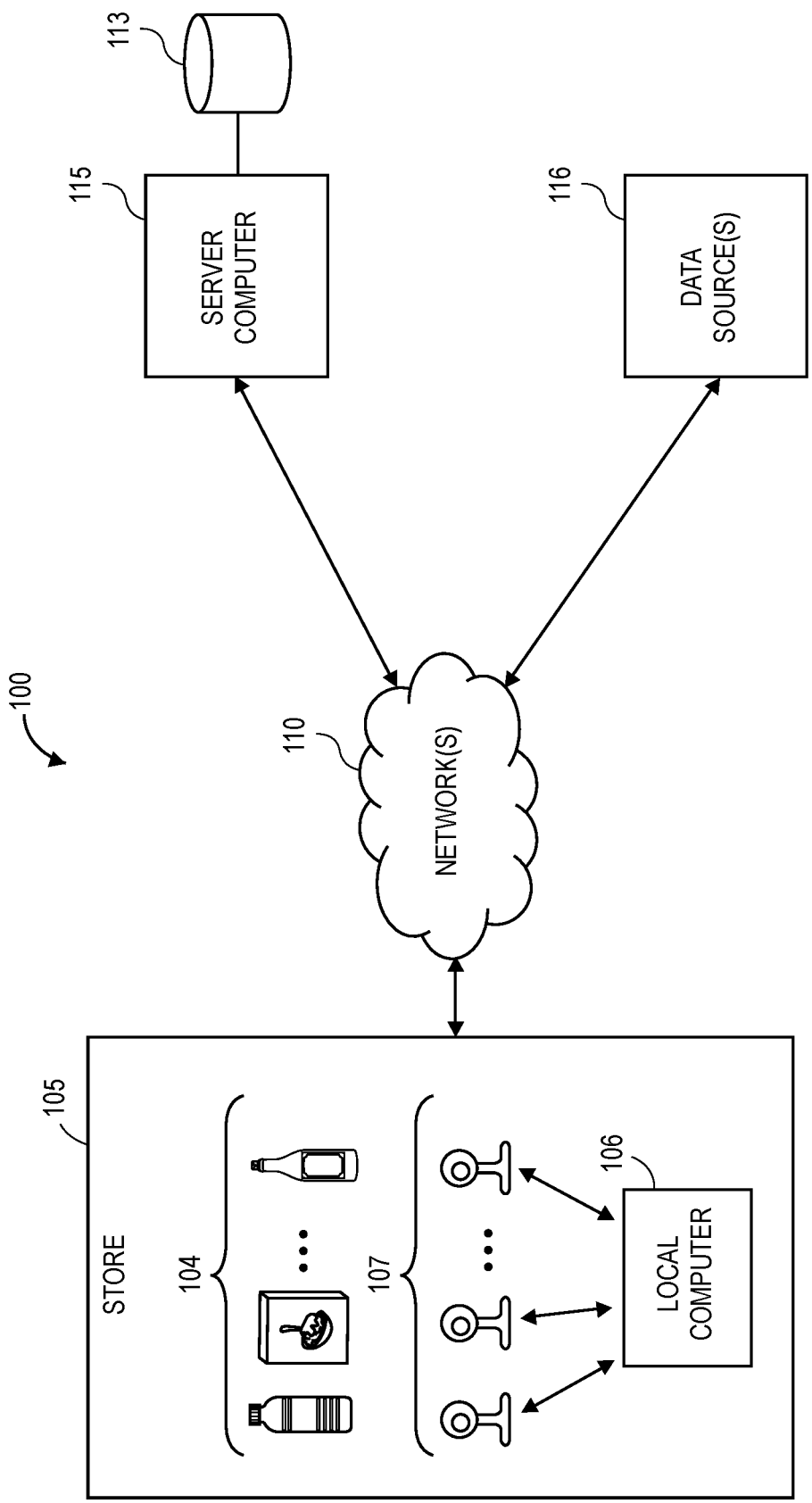
FIG. 1 depicts an overview of components and entities associated with the systems and methods, in accordance with some embodiments.

FIG. 1 illustrates an overview of a system 100 of components configured to facilitate the systems and methods. It should be appreciated that the system 100 is merely an example and that alternative or additional components are envisioned.

As illustrated in FIG. 1, the system 100 may depict a store 105 that may represent any environment of various types and sizes that offers products and/or services for purchase by customers (i.e., individuals or users). Generally, the store 105 may be configured to avail a set of products 104 for customers or employees to retrieve, grab, hold, examine, replace and, in some cases, bring to a point of sale (POS) terminal for purchase. In some implementations, the store 105 may not have POS terminals.

The products 104 may be arranged into sets/groups of the same or similar products within the store 105. For example, a group of milk cartons may be arranged in an inclined loading mechanism in a refrigerator such that if a customer selects the milk carton at the front of the line, the remaining milk cartons may slide forward so that a new milk carton is now at the front of the line. For further example, a group of cereal boxes may be arranged on a shelf such that if a customer selects the cereal box at the front of the shelf, at least the next cereal box behind the selected cereal box is visible on the shelf. Generally, products may be arranged front-to-back, side-to-side, and/or according to other configurations.

Each of the products 104 may have affixed a unique product identifier (UPI) that includes a code or symbol that may uniquely identify each and every product 104. For example, each and every stick of deodorant that is offered for sale in the store 105 may have affixed a UPI even though at least some of the sticks of deodorant may be the same type, kind, and/or size. Accordingly, each product 104 in the store 105 may have associated a UPI that distinguishes that product 104 from each of the other products 104.

In some situations, a generic SKU such as a generic product identifier (GPI) may be used instead of a UPI. Accordingly, although certain embodiments are described herein using UPIs (or more generally, "identifiers"), it should be understood that the embodiments also envision using GPIs, or some combination of UPIs and GPIs.

Each UPI may be printed or affixed onto the respective product 104 (or a component of the product, such as a packaging, container, product label, and/or the like). It should be appreciated that the UPI may be printed or affixed to the product 104 before, during, or after the manufacturing or packaging of the product 104. Accordingly, when the store 105 receives the products 104 for sale, the UPIs may already be printed or affixed to the product 104. It should be appreciated that the store 105 (or more particularly, an entity or individuals associated with the store 105) may print or affix the UPIs to the products 104.

Each UPI may generally be a digital marker such as a 1D code (i.e., a type of bar code), 2D code (e.g., a type of QR code), custom 2D code, or other type of code. In embodiments, a custom 2D code may use elements of a standard QR code such as three (3) calibration or reference points and visual bits, or "1"s and "0"s dispersed in designated areas that can be dark or light. The custom 2D codes may deviate from standard QR codes in that they may not be limited to a square shape, and the number of bits that can present may be aligned to the projected number of unique codes that a product or category space will need in order to provide enough codes to every unit over a given production period (e.g., five years). Custom 2D codes may allow UPIs to conform in size, shape, and number of bits based on a package, label, and/or container size of a given product. Additionally, fewer bits in a given space may allow for any dark or light areas to be larger and therefore easier to recognize by a scanner or sensor.

In various implementations, UPIs may also be applied or affixed to advertising materials that may be found in or outside the store 105. As described herein, the term "product" may encompass an advertising material. Examples of advertising materials include promotional signs that may be placed near certain products, price indicators, fixture headers, brand equity signs, and compliance signs. In some situations, it may not be necessary to print UPIs that are unique to the individual unit of advertising material; rather, it may be necessary to use UPIs unique to the description of the advertisement.

In various implementations, the systems and methods may print or affix UPIs to the respective products 104 at the time of product manufacturing. However, such implementations may be difficult or costly due to one or more of the following reasons: manufacturing equipment may be of a compact design that does not allow for the addition of new printing or affixing process without significant retooling, manufacturing production line speeds may be too fast to allow for an acceptable quality of printing or affixing of the UPIs, and/or the manufacturer may use a variety of manufacturing processes and retooling, among other reasons.

As an alternative to affixing the UPIs during the production or packaging stage of the products 104, the systems and methods may alternatively affix the UPI to the packaging, label, and/or container of a product 104 at an earlier stage of manufacturing. For example, the systems and methods may apply or affix the UPIs during the printing of a product packaging, as many products are sold in packages that carry branding identifiers, product information, and/or other messages to consumers, and these packages are generally printed at a time and place separate from when the product 104 is placed in the package and made ready to be sold. As another example, the systems and methods may apply or affix the UPIs during the printing of labels for the products 104, as many products are sold in containers where a label is affixed that contains branding, product information, and/or other messages to the end user, as these labels are generally printed or manufactured at a time and place separate from when the label is affixed to the product 104 itself or the container that houses the product 104. As a further example, the systems and methods may apply or affix the UPIs during the production of containers for the products 104, as many products are sold in containers which are manufactured at a time and place separate from when the product will be placed in the container. For purposes of discussion, it may be assumed that the product 104 discussed herein may include the product as well as the components related to the product (e.g., container, packaging, labels, etc.).

Generally, if a UPI is affixed before the time of product manufacture, it may be difficult to encode the relevant data into the UPI. To remedy this, the systems and methods may provide each unit of product with a unique code in series, where the code may have some convention inherent to it (e.g., SKU identification). The systems and methods may pair the associated codes in a registry system that enables for the effective access and reading of the codes. This implementation may be needed because the number of needed areas of a product that can be "dark" or "light" is reduced when uniqueness is needed, thus enabling for larger "dark" or "light" areas, which may be easier to read by a sensor.

Certain products may have more than one orientation that is acceptable for merchandising (e.g., a beverage in a round container such as a can or bottle.) In these situations, the applicable UPI may be of a custom shape and size to allow it to be applied several times across the possible orientations.

As the UPI is applied to or affixed to an area(s) of a product that is highly visible to a sensor but also to consumers, the UPI may be unperceivable to the human eye, in some embodiments. Accordingly, the systems and methods may use a class of inks referred to as "infrared (IR) inks," "IR excitation inks," or "IR security inks" (generally, "IR ink"). IR ink can be transparent to the human eye but react to light outside of the range of human perception. This reaction is referred to as a "Stokes Shift," which occurs when a material absorbs a photon at one frequency and emits a photon at a separate frequency. Generally, if a camera or sensor were only able to see a narrow band of light frequency specific to an IR ink's point of absorption, the IR ink would appear black. In contrast, if a camera or sensor were only able to see a narrow band of light frequency specific to an IR ink's point of emission, the IR ink would appear bright white. Because the human eye can see up to a wavelength of roughly 750 nm, if IR ink with an absorption point of 790 nm and an emission point of 850 nm (i.e., wavelengths outside the visible spectrum) were used in UPIs affixed to products, the IR ink could be seen or sensed with a sensor of appropriate design while not being perceivable by the human eye.

In embodiments, and depending on the specific application, the systems and methods may use several IR inks in concert. For example, the systems and methods may print a solid base layer with IR ink that absorbs light at 850 nm, and then print an UPI on top of the base layer in an IR ink that emits at 850 nm. This would result in a high contrast UPI that may be needed or desired on products or packages that are light in color.

In situations in which an IR ink presents a slight tint when applied to a white background, the systems and methods may apply the IR ink before any visible ink is applied. Depending on the composition of the visible ink, IR light may pass through the visible ink uninhibited.

Additionally or alternatively, an invisible ultraviolet (UV) ink may be used instead of an IR ink. According to embodiments, an invisible UV ink may be imperceptible in the visual spectrum under normal light, and may be visible when illuminated by a UV light (or blacklight). Although some of the embodiments as described herein reference the use of IR ink, it should be appreciated that other types of inks (e.g., UV ink) may be used.

As depicted in FIG. 1, the store 105 may be further configured with a set of sensor components 107 and a local computer 106. According to embodiments, the set of sensor components 107 may be disposed or located at various locations of the store 105, and may be oriented to sense or detect the UPIs printed or affixed on the products 104. In particular, each of the set of sensor components 107 may be positioned in a line-of-sight of one or more of the set of products 104. For example, one sensor component 107 may be secured to a ceiling of the store 105 above a particular portion of the cereal aisle. As another example, another sensor component 107 may be positioned on a shelving unit across from a refrigerator that stores frozen dinners.

Each of the sensor components 107 may be equipped with one or more light sources that may emit light at a frequency corresponding to an absorption frequency of a UPI(s) associated with one or more of the products 104, where the UPI(s) may correspondingly emit light at an emission frequency that may be detectable by sensors of the sensor components 107. In embodiments, the sensor components 107 may be equipped with a band-pass filter that may pass light of a certain range of frequencies and attenuate frequencies outside that range. The components of the sensor components 107 are further described with respect to FIGS. 3A and 3B.

In an implementation, the sensor components 107 may be configured with a processor and one or more communication components, where the processor may process the sensed data and the communication components may transmit the processed data to one or more other components, devices, or the like. In an additional or alternative implementation, the sensor components 107 may interface with a local computer 106, where the sensor components 107 may communicate raw or processed sensor data to the location computer 106 for further processing and/or communication.

The system 100 of FIG. 1 may further include a server computer 115 configured to communicate with components of the store 105 via one or more networks 110. The server computer 115 may be associated with an entity such as a company, business, corporation, or the like, which may manage the manufacture, sale, and/or distribution of products that are sold or may be sold in the store 105. For example, the server computer 115 may be associated with a consumer goods corporation that may be interested in the current and projected sales of certain of its products. It should be appreciated that the set of sensor components 107 may be associated with the same entity or a different entity to which the server computer 115 is associated. Additionally, it should be appreciated that each of the set of sensor components 107 and/or the server computer 115 may be associated with multiple entities. For example, the set of sensor components 107 may sense data identifying several different products or brands associated with multiple different entities.

The local computer 106 and/or the set of sensor components 107 may transmit or communicate, via the network(s) 110, any raw or processed data detected or captured by the set of sensor components 107 and associated with the set of products 104. In embodiments, the network(s) 110 may support any type of data communication via any standard or technology including various wide area network or local area network protocols (e.g., GSM, CDMA, VoIP, TDMA, WCDMA, LTE, EDGE, OFDM, GPRS, EV-DO, UWB, Internet, IEEE 802 including Ethernet, WiMAX, Wi-Fi, Bluetooth, and others). The system 100 may further include a set of data sources 116 that may communicate with the server computer 115 and the components of the store 105 via the network(s) 110. According to embodiments, the set of data sources 116 may generate, store, and provide information related to products that are for sale or may be sold within the store 105.

The server computer 115 may be configured to interface with or support a memory or storage 113 capable of storing various data, such as in one or more databases or other forms of storage. The storage 113 may store and maintain a registry that may associate information associated with products with UPIs of the products.

According to embodiments, a sensor(s) (not depicted in FIG. 1) may be installed or disposed in the manufacturing process such that the sensor(s) may have a line-of-sight view of UPIs applied on or affixed to products as the associated products travel through the production/manufacturing steps, where the location of the sensor(s) installation may be dependent on each manufacturing operation. The sensor components used in the manufacturing process may be similar to the set of sensor components 107 in the store 105, although the manufacturing sensor components may additionally or alternatively use hardwired data transmission and a high frame-rate sensor.

The sensor(s) may transmit data associated with the sensed UPIs to the server computer 115 that maintains the registry in the storage 113. In particular, the registry may associate UPIs with relevant information for the associated product, such as SKU, date, time, facility, operator, specific value offering, expiration date, unit, case, carton, pallet, truck, intended customer, and/or other information. In embodiments, the systems and methods may ingest and store the relevant information via manual entry or by interfacing with a batch production system (or similar system) of the manufacturer or other entity. When a UPI is linked to relevant information of a product, the server computer 115 may transmit, via the network(s) 110, data included in the registry to a cloud or physical processing facility for storage, and from where the data may be accessed when the UPIs are detected in a store. According to embodiments, the registry implementation may include an interface(s) to pull data from a batch operating system or ingest data from machine operators.

Although depicted as a single server computer 115 in FIG. 1, it should be appreciated that the server computer 115 may be in the form of a distributed cluster of computers, servers, machines, or the like. In this implementation, the entity may utilize the distributed server computer(s) 115 as part of an on-demand cloud computing platform. Accordingly, when the components of the store 105 interface with the server computer 115, the components of the store 105 may actually interface with one or more of a number of distributed computers, servers, machines, or the like, to facilitate the described functionalities.

Figure 2:
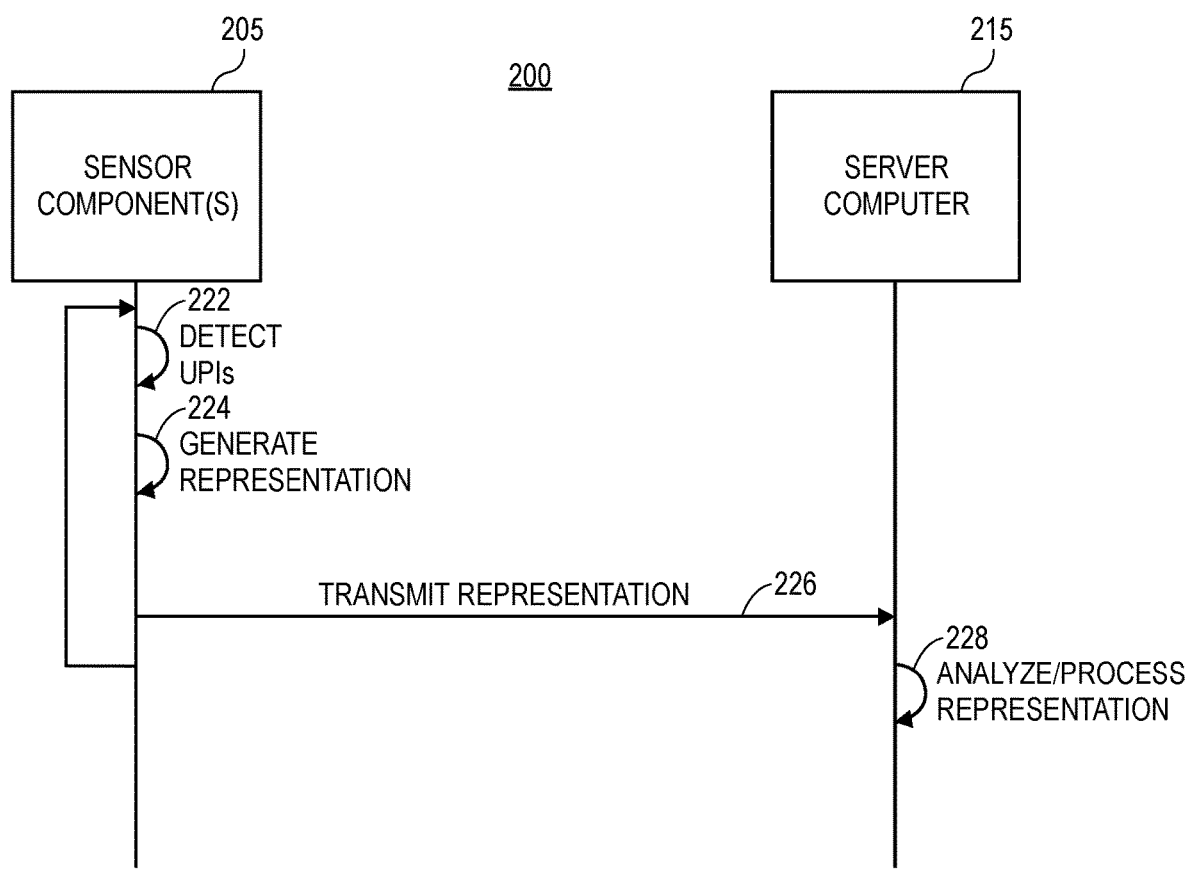
FIG. 2 depicts a signal diagram of certain components and functionalities associated therewith, in accordance with some embodiments.

FIG. 2 depicts a signal diagram 200 associated with the collection and transmission of UPI data. The signal diagram 200 includes at least one sensor component 205 (such as one of the sensor components 107 as discussed with respect to FIG. 1) and a server computer 215 (such as the server computer 115 as discussed with respect to FIG. 1). It should be appreciated that the sensor component(s) 205 may be installed or disposed in a store that offers a set of products for sale (e.g., hung or attached to a ceiling, on a wall, on a shelf or other permanent part of a building or equipment, etc.).

The signal diagram 200 may begin when the sensor component(s) 205 detects (222) a set of UPIs in its field of view, where the set of UPIs may be affixed or applied to a corresponding set of products. In particular, the sensor component(s) 205 may operate a software application executable by a computer processor that may build, based on the detected set of UPIs, a representation of the field of view into a 2D model. The software application may be configured to generate each representation according to the products being in a serial organization or a reference organization. For example, a serial organization may be a set of products arranged on eight (8) shelves each with forty (40) spring load pushers, where the software application may generate a representation such as "shelf: 1, facing: 10, new UPI: 0010001000101000101, time: 12:12:12, date: 1-1-19". For further example, a reference organization may be a non-uniform sized product sold from hanging rods, where the software may generate a representation such as "x: 500-550, y: 400-450, new UPI: 00101000101001001, time: 12:14:12, date: 1-2-19". According to embodiments, because the sensor component(s) 205 observes a field of view (FOV), the sensor component(s) 205 may generate a two-dimensional or matrix representation of the FOV, where the generated representation may map where a fixed inventory location (FIL) is in reference to the other FILs detectable in the FOV. For example, an FIL within a retail location can be an individual springload pusher that is mounted to a shelf which is among several other springload pushers from which products can be stocked and sold. Another example of a FIL is an individual gravity-fed tray mounted to a shelf which is among several other gravity-fed trays from which products can be stocked and sold. The representation may identify shelves (e.g. shelf 1, shelf 2, etc.) and left-to-right serial placement of FILs (e.g. FIL 1, FIL 2, etc.). In situations where products are merchandised on adjustable hooks or other non-uniform formats, the FIL may be identified by the X-Y coordinates it occupies within the FOV, as illustrated in Table 1:

TABLE 1

| Shelf 1 | FIL 1 | FIL 2 | FIL 3 | FIL 4 |
| Shelf 2 | FIL 1 | FIL 2 | FIL 3 | FIL 4 |
| Shelf 3 | FIL 1 | FIL 2 | FIL 3 | FIL 4 |

In embodiments, the software application may also facilitate image subtraction or image division where the sensor software may compare two images and erase all pixels that are similar from an output image. The software application may employ this technique in situations where there may be one frame indicating at least one emitting UPI and one frame that does not indicate an emitting UPI, where the software application may output, as an output image, any visible changes, such as a fluorescing UPI.

After generating the representation, the sensor component(s) 205 may transmit (226) the representation to the remote server 215 via a network connection (e.g., a cellular connection). In an embodiment, the sensor component(s) 205 may transmit the representation to a computing device within the store via a local area connection, which may transmit the representation to the remote server 215 via a wide area connection. The sensor component(s) 205 may repeat (222), (224), and (226) periodically (i.e., at set time intervals). Additionally or alternatively, the sensor component(s) 205 may generate and transmit a representation when the sensor component(s) 205 detects a change in the detected UPIs, where the representation may reflect which product(s) are no longer detected (i.e., which product(s) has been purchased or otherwise retrieved by an individual) and which product(s) are now detected (i.e., which product(s) has replaced the product(s) that is no longer detected). In particular, the sensor component(s) 205 may compare the representation to a previously-generated representation, and identify a difference between the representation and the previously-generated representation, and may transmit the information in response to this comparison. In embodiments, the sensor component(s) 205 may transmit the representation as a set of data packets that may comprise a set of timestamps. According to embodiments, as new UPIs become visible, the sensor component(s) 205 may transmit the new UPI(s), time of visibility/detection, and applicable FIL(s) to the remote server 215. If an FIL no longer contains a UPI, then the representation may indicate an empty product facing.

According to some embodiments, after the sensor component(s) 205 is installed at a retail location, the sensor component(s) 205 may begin transmitting a complete representation of its field of view to the server computer 215. When the representation is established at the server computer 215, the sensor component(s) 205 may transmit any changes (i.e., the delta) to the representation to the server computer 215. In particular, when the sensor component(s) 205 detects different UPI(s) in a field of view, the sensor component(s) 205 may transmit a change or difference between the previously-generated representation and a currently-generated representation. While the sensor component(s) 205 may transmit data at the time of observation, the sensor component(s) 205 may alternatively transmit packets of data at specific time intervals with a timestamp representing each change of the representation. The use of data packets may allow for opportunities to better validate data accuracy between the sensor component(s) 205 and the server computer 215. Additionally, the use of data packets may result in a reduction in data transmission costs.

The server computer 215 may analyze/process (228) the representation. In particular, the server computer 215 may match the code(s) included in the representation with a registry to determine which product(s) are represented in the representation. Additionally, the server computer 215 may determine, from one or more representations transmitted from the sensor component(s) 205, changes to the product inventory. For example, if a representation indicates that a product is no longer detected, the server computer 215 may designate that product as being purchased or otherwise no longer available for sale at its original location within the store.

In embodiments, because the sensor component(s) 205 relies on line-of-sight to observe the UPI(s), there are situations where the sensed data may be incomplete. An example of this situation is when two or more of a product is selected by an individual at one time and the sensor component(s) 205 may not be able to observe the additional product(s) selected. The server computer 215 may account for this incomplete data by analyzing the data via negitiva (i.e., UPIs not observed that should have been observed and that could help fill in gaps created by non-observed UPIs). The server computer 215 may alternatively or additionally mitigate these potential instances by establishing historical data trends, assessing percentages of multi-unit sale, and conducting a time series analysis of the absence of a product from a representation(s).

The server computer 215 may further determine how to manage product inventory based on the representations(s) transmitted from the sensor component(s) 205. In particular, because the representation(s) indicate products that are purchased or otherwise no longer available for sale, the server computer 215 may determine that additional products may need to be stocked or ordered. Additionally or alternatively, the server computer 215 may determine that one or more particular products are not being sold (or are experiencing low sales volume), in which case the server computer 215 may determine potential replacement products.

The systems and methods may enable to the server computer 215 to have access to real-time or near-real-time data descriptive of product availability in stores. Various benefits are envisioned, including the possibility to engage and incentivize employees of retail locations via automated communication services. For example, the server computer 215 may generate and transmit, to a set of computing devices associated with a store (e.g., handheld devices that employees may hold), a set of information associated with the inventory of the store and indicating the product availability, what products have sold or have been selling, and/or other information. For example, the server computer 215 may transmit various electronic communications, such as emails, text messages, messaging communications, and/or the like. Additionally, retailers and manufacturers may experience cost reductions through the reduction is such activities and tasks as changing signs, resetting the arrangement of products on a shelf, or checking for additional product in a storage area. Additionally, retail agents may use communications or applications on electronic devices that may enable communications with an automated service.

Various automated engagement use cases are also envisioned. Currently, when new products are brought to market, there is no way for marketers to quickly and accurately know what retail locations properly display the new product and/or advertising materials. With the systems and methods, marketers may more easily ensure that retailers are presenting new products correctly and may more quickly and easily discern the viability of new products.

Additionally, manufacturers of consumer goods spend billions of dollars a year (e.g., through trade programs) incentivizing retailers to sell their products in a specific way. Currently, the most common way to validate that retailers are adhering to said programs are for sales representatives to periodically visit the stores in person, however these visits provide just a snapshot of data. In contrast, the systems and methods may provide retailers with small job incentives that will bring the store into compliance and keep it compliant.

Moreover, there are advertisements that need to be changed at retail locations to communicate new messages to consumers, where the current options to change the advertisements include sending a sales representative or paying a retailer and hope that they fulfill their agreement. However, these options are expensive and can lead to sub-standard/optimal results. The systems and methods may employ automated retailer engagements that incentivize retailers and validate placement of rotational signs in real-time or near-real-time.

Various sensors and sensor configurations are envisioned for observing UPIs, generating 2D representations of a field of view, and transmitting data to a processing facility or other central repository (e.g., the server computer 115, 215 as discussed with respect to FIGS. 1 and 2).

One sensor configuration is a near infrared (NIR) emitting light source with band-pass filter in which a light source, such as an LED or other light source, may be directed in the field of view of applicable products and emit radiation in a bandwidth that corresponds to the NIR absorption point of the IR ink present in the UPI affixed to the product(s). A sensor, such as a low lux CMOS chip, may also be directed in the field of view. Before the light enters the lens of the CMOS chip, it passes through a band-pass filter which blocks light except for a band of light having a frequency corresponding to the emission point of the IR ink. In certain embodiments, this sensor may not be equipped with the NIR emitter, as it may be possible for an image processor to correctly read any slight effects of IR ink with the naturally-occurring light at the absorption and emission wavelengths.

Another sensor configuration is an oscillating NIR emitting light source with band-pass filter in which a light source, such as an LED, diffused laser, raster laser, or other light source, may be directed in the field of view of applicable products and emit radiation in a bandwidth that corresponds to the NIR absorption point of the IR ink present in the UPI affixed to the product(s). In this configuration, an oscillator may cause the LED to oscillate between on and off and allow for every other frame captured by the sensor to either show the IR ink fluorescing or the ink in a relaxed state. The sensor may process two adjacent frames through image subtraction that results in an output image showing UPI(s). A sensor, such as a low lux CMOS, CCD, or other chip that may be capable of NIR operation, may also be directed in the field of view. Before the light enters the lens of the CMOS, CCD, or other chip, it passes through a band-pass filter which blocks light except for a band of light having a frequency corresponding to the emission point of the IR ink. If the LED does not operate continuously, it may be configured to power on and off (i.e., operate as a flash). Due to limitations in achieving peak forward current, the frame rate may be limited, in some embodiments.

An additional sensor configuration may be a stereo sensor with an NIR emitter. In this configuration, two or more CMOS, CCD, or other sensors may be arranged adjacent to each other, where a first sensor may be equipped with a band-pass filter that may operate at an absorption frequency, and a second sensor that may be equipped with a band-pass filter that may operate at an emission frequency. The images may be processed through image subtraction to isolate a fluorescence of the IR ink. Additionally, a light source emitting at the absorption frequency of the ink may be used to increase quantum yield.

According to embodiments, each of these sensor configurations may also be equipped with an image recognition camera. Generally, there may be times when retailers and manufacturers desire data on products that do not have UPIs. In this situation, as sensor(s) may capture images of the field of view, the images may be analyzed using various image recognition techniques that may result in additional data that may be further analyzed or processed.

Figure 3B:
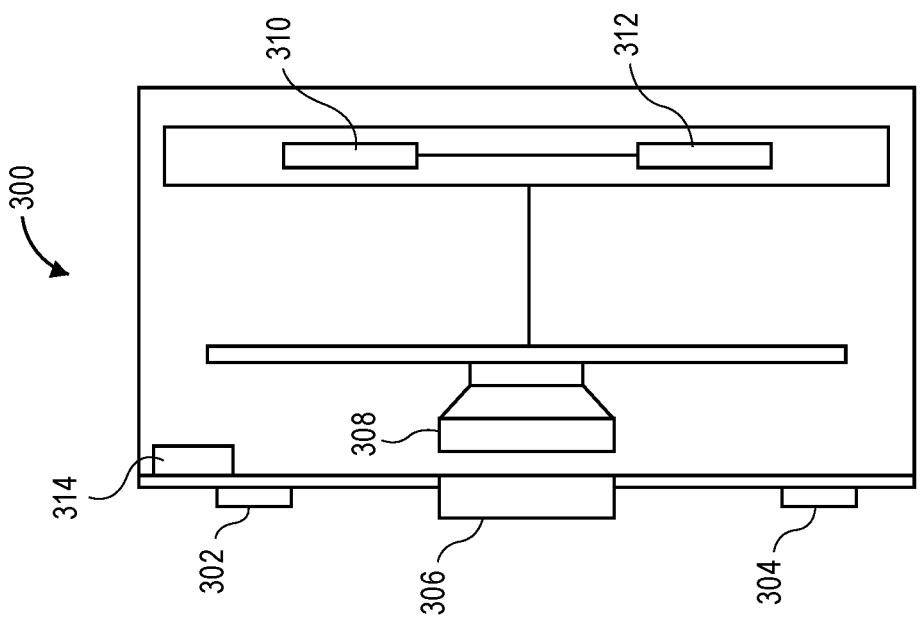
FIGS. 3A and 3B depict diagrams of example sensor components, in accordance with some embodiments.
Figure 3A:
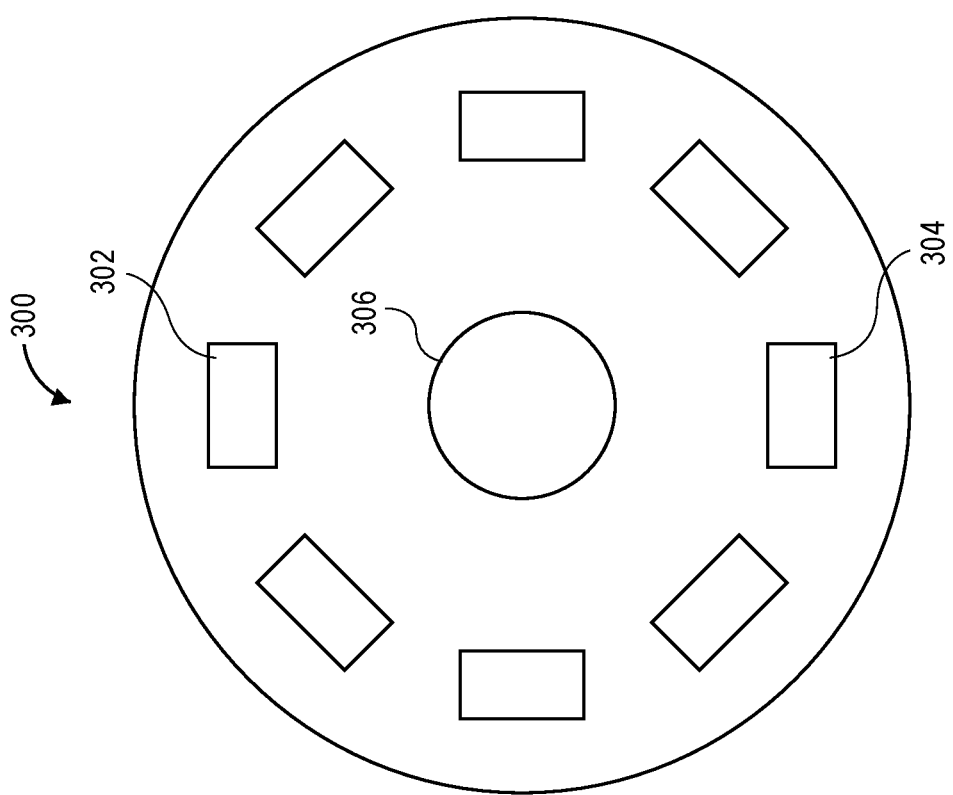

FIG. 3A depicts a front view of a sensor component 300 according to the systems and methods described herein, and FIG. 3B depicts a cross-section side view of the sensor component 300. It should be appreciated that the sensor component implementations depicted in FIGS. 3A and 3B are merely examples, and alternative and additional implementations are contemplated.

The sensor component 300 may include a set of LEDs 302, 304 that may be disposed or mounted on a surface of the sensor component 300. FIG. 3A depicts the eight (8) such LEDs that are rectangular in shape and that are disposed in a circular manner about a center of the sensor component 300. However, it should be appreciated that fewer or more LEDs may be employed, where the LEDs may be different shapes and sizes, and may be disposed in alternative configurations, shapes, or the like. Further, it should be appreciated that alternative light sources other than LEDs such as a diffused or raster laser(s) may be used.

According to embodiments, each of the LEDs 302, 304 may emit light at a certain wavelength or range of wavelengths. For example, each of the LEDs 302, 304 may emit light at a wavelength of 800 nm (or another wavelength or range of wavelengths).

The sensor component 300 may further include a band-pass filter 306 which is configured to pass frequencies within a certain range and attenuate frequencies outside that range. In operation, the light output by the LEDs 302, 304 may be absorbed by a UPI(s) affixed to a product(s), where the UPI(s) may emit a light at an emission frequency and where the band-pass filter 306 may be configured to pass light at the emission frequency of the UPI(s). Accordingly, any light emitted by the UPI(s) at the emission frequency will pass through the band-pass filter 306.

The sensor component 300 may further be configured with a sensor 308 that may detect or sense any light that passes through the band-pass filter 306 (e.g., any light emitted by the UPI(s) at the emission frequency). The sensor 308 may be communicatively connected to a processor 310, where the sensor 308 may send data indicative of the sensed light to the processor 310 for any additional analysis and processing.

According to embodiments, the processor 310 may analyze the data from the sensor 308 to determine or identify the UPI(s) indicated in the data. Additionally, the processor 310 may generate a representation(s) corresponding to the determined UPI(s), as discussed herein. The sensor component 300 may be further configured with a communication module 312 that may be configured to communicate with various components. The communication module 312 may include one or more transceivers (e.g., WWAN, WLAN, and/or WPAN transceivers) functioning in accordance with IEEE standards, 3GPP standards, or other standards, and configured to receive and transmit data via one or more external ports. For example, the communication module 312 may communicate with the server computer 215 as described with respect to FIG. 2 via one or more networks.

In an optional implementation, the sensor component 300 may be configured with an oscillator 314 which may cause the LEDs 302, 304 to oscillate between on and off and allow for every other frame captured by the sensor 308 to either show IR ink fluorescing or the ink in a relaxed state. Accordingly, the processor 310 may process two adjacent frames through image subtraction that results in an output image showing UPI(s). It should be appreciated that the sensor component 300 may include mounting components (not shown in the figures) configured to secure the sensor component 300 to various components within a store.

Figure 4:
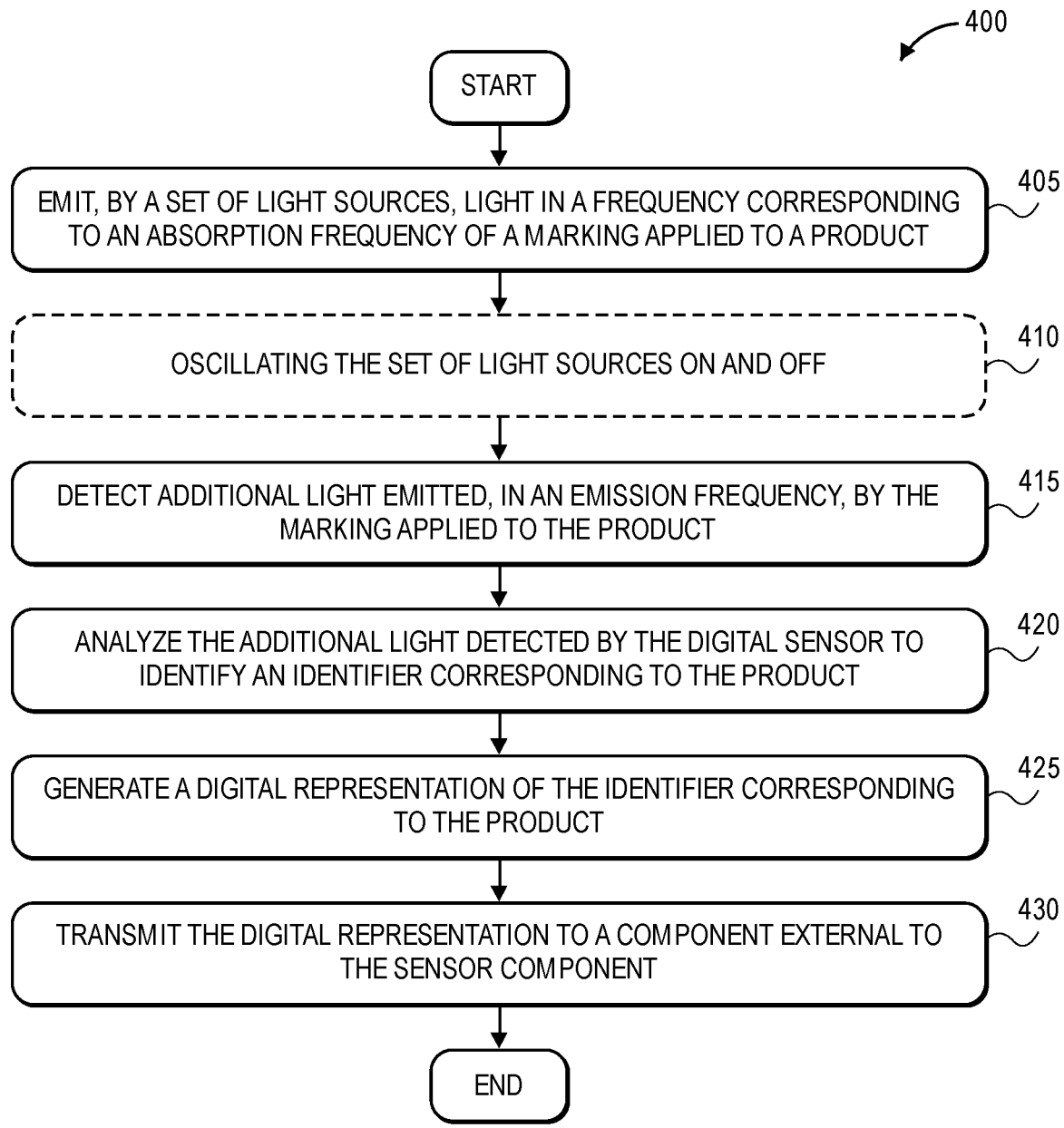
FIG. 4 is an example flowchart associated with identifying products by a sensor component, in accordance with some embodiments.

FIG. 4 depicts is a block diagram of an example method 400 for identifying products within a store. The method 400 may be facilitated by a sensor component and associated components that may be in communication with a server computer.

The method 400 may begin when a set of light sources emits (block 405) light in a frequency corresponding to an absorption frequency of a marking applied to a product. In an optional implementation, an oscillator may cause (block 410) the set of light sources to oscillate on and off.

When the marking applied to the product absorbs the emitted light, the marking may emit additional light at an emission frequency. Accordingly, a digital sensor may detect (block 415) the additional light emitted at the emission frequency. In embodiments, the sensor component may be configured with a band-pass filter configured to pass through light at the emission frequency.

A computer processor may analyze (block 420) the additional light detected by the digital sensor to identify an identifier (e.g., a UPI) corresponding to the product. If the sensor component comprises an oscillator, the additional light may include two adjacent image frames, and the computer processor may generate, using an image subtraction or division technique based on the two adjacent image frames, an output image indicating the identifier corresponding to the product.

The computer processor may generate (block 425) a digital representation of the identifier corresponding to the product. In embodiments, the digital representation may include additional data indicating the configuration and/or location of the product within the store. Additionally, the digital representation may indicate a difference from a previously-generated digital representation (i.e., the digital representation may indicate the identifier that was not included in the previously-generated digital representation).

The sensor component may transmit (block 430), via a transceiver, at least a portion of the digital representation to a component external to the sensor component. According to embodiments, the component external to the sensor component may analyze the digital representations for further processing, as discussed herein.

Figure 5:
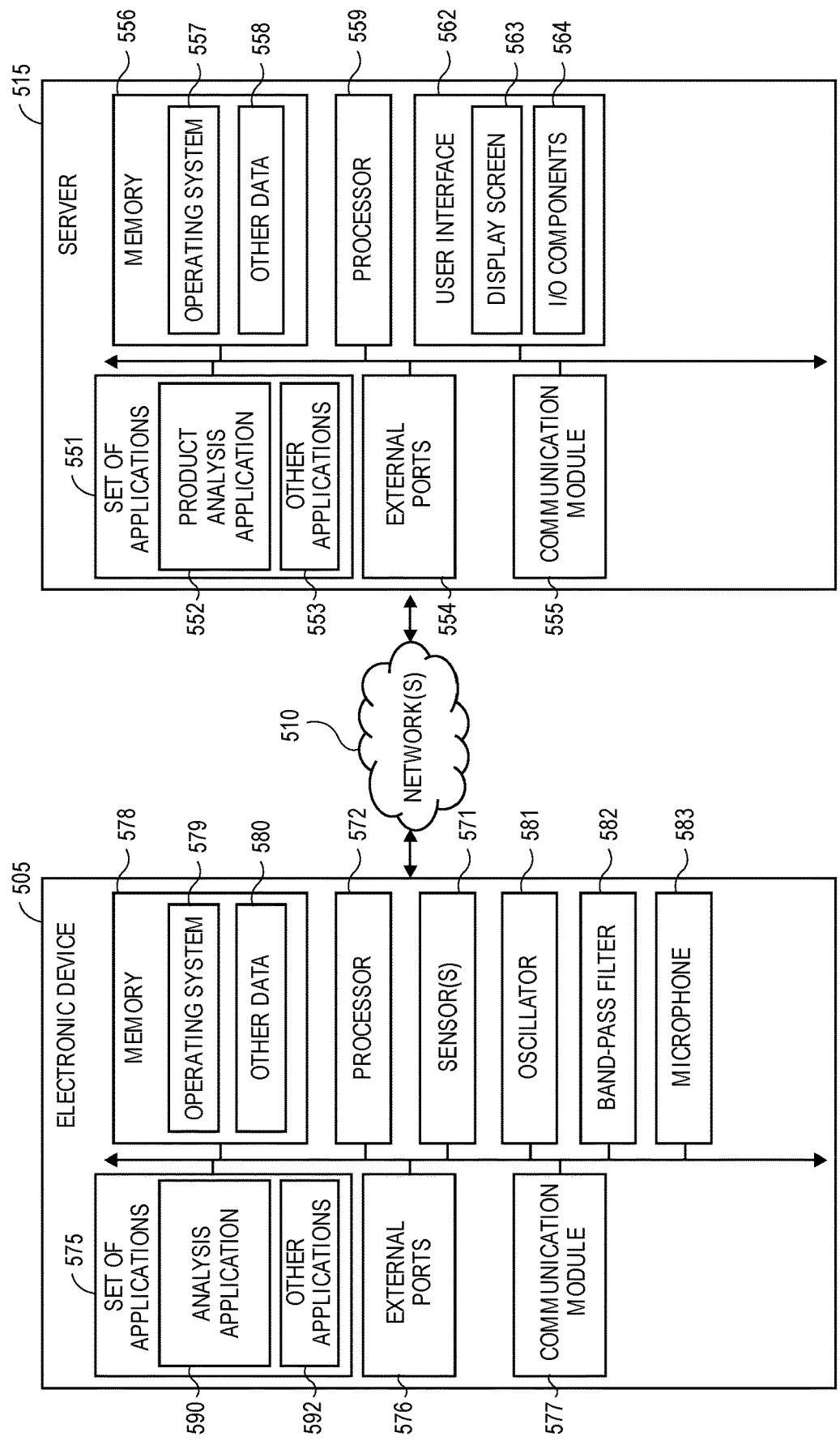
FIG. 5 a hardware diagram depicting an example server and an example sensor component.

FIG. 5 illustrates a hardware diagram of an example sensor component 505 (such as the sensor component 205 as discussed with respect to FIG. 2) and an example server 515 (such as the server computer 215 as discussed with respect to FIG. 2), in which the functionalities as discussed herein may be implemented.

The sensor component 505 may include a processor 572 as well as a memory 578. The memory 578 may store an operating system 579 capable of facilitating the functionalities as discussed herein as well as a set of applications 575 (i.e., machine readable instructions). For example, one of the set of applications 575 may be an analysis application 590 configured to analyze light detected by a sensor(s) 571 and generate representations of depicted UPIs, as discussed herein. It should be appreciated that one or more other applications 592 are envisioned.

The processor 572 may interface with the memory 578 to execute the operating system 579 and the set of applications 575. According to some embodiments, the memory 578 may also include other data 580 including data associated with collected documentation and/or other data. The memory 578 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The sensor component 505 may further include a communication module 577 configured to communicate data via one or more networks 510. According to some embodiments, the communication module 577 may include one or more transceivers (e.g., WWAN, WLAN, and/or WPAN transceivers) functioning in accordance with IEEE standards, 3GPP standards, or other standards, and configured to receive and transmit data via one or more external ports 576. For example, the communication module 577 may communicate with the server 515 via the network(s) 510.

The sensor component 505 may include the set of sensors 571 such as, for example, a location module (e.g., a GPS chip), an image sensor, and/or other sensors. Additionally, the sensor component 505 may include a set of light sources 583 configured to emit light, a band-pass filter 582 configured to pass through light of a certain frequency range, and an oscillator 581 configured to oscillate the set of light sources 583 on and off.

As illustrated in FIG. 5, the sensor component 505 may communicate and interface with the server 515 via the network(s) 510. The server 515 may include a processor 559 as well as a memory 556. The memory 556 may store an operating system 557 capable of facilitating the functionalities as discussed herein as well as a set of applications 551 (i.e., machine readable instructions). For example, one of the set of applications 551 may be a product analysis application 552 configured to analyze data submitted from the sensor component 505. It should be appreciated that one or more other applications 553 are envisioned.

The processor 559 may interface with the memory 556 to execute the operating system 557 and the set of applications 551. According to some embodiments, the memory 556 may also include other data 558, such as data associated with a data model, data received from the sensor component 505, and/or other data. The memory 556 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The server 515 may further include a communication module 555 configured to communicate data via the one or more networks 510. According to some embodiments, the communication module 555 may include one or more transceivers (e.g., WWAN, WLAN, and/or WPAN transceivers) functioning in accordance with IEEE standards, 3GPP standards, or other standards, and configured to receive and transmit data via one or more external ports 554. For example, the communication module 555 may receive, from the sensor component 505, a set of digital representations of URIs detected by the sensor component 505.

The server 515 may further include a user interface 562 configured to present information to a user and/or receive inputs from the user. As shown in FIG. 5, the user interface 562 may include a display screen 563 and I/O components 564 (e.g., ports, capacitive or resistive touch sensitive input panels, keys, buttons, lights, LEDs). According to some embodiments, the user may access the server 515 via the user interface 562 to review information, make selections, and/or perform other functions.

In some embodiments, the server 515 may perform the functionalities as discussed herein as part of a "cloud" network or may otherwise communicate with other hardware or software components within the cloud to send, retrieve, or otherwise analyze data.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code may be adapted to be executed by the processors 572, 559 (e.g., working in connection with the respective operating systems 579, 557) to facilitate the functions as described herein. In this regard, the program code may be implemented in any desired language, and may be implemented as machine code, assembly code, byte code, interpretable source code or the like (e.g., via Golang, Python, Scala, C, C++, Java, Actionscript, Objective-C, Javascript, CSS, XML). In some embodiments, the computer program product may be part of a cloud network of resources.

Although the following text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical.

What is claimed is:

1. A computer-implemented method of identifying products by a sensor component, the method comprising:
    emitting, by a set of light sources disposed on the sensor component, light in a frequency corresponding to an absorption frequency of a marking applied to a product;
    detecting, by a digital sensor, additional light emitted, in an emission frequency, by the marking applied to the product, wherein the additional light passes through a band-pass filter;
    analyzing, by a computer processor, the additional light detected by the digital sensor to identify an identifier corresponding to the product; and
    generating, by the computer processor, a digital representation of the identifier corresponding to the product, wherein the digital representation indicates a difference from a previously-generated digital representation.

2. The computer-implemented method of claim 1, further comprising:
    transmitting, by a transceiver via a network connection, at least a portion of the digital representation to a component external to the sensor component.

3. The computer-implemented method of claim 2, wherein transmitting at least the portion of the digital representation comprises:
    comparing the digital representation to the previously-generated digital representation to identify a difference between the digital representation and the previously-generated digital representation; and
    in response to the comparing, transmitting at least the portion of the digital representation to the component external to the sensor component.

4. The computer-implemented method of claim 1, further comprising:
    oscillating the set of light sources on and off;
    wherein the additional light detected by the digital sensor comprises two adjacent image frames, and wherein analyzing the additional light comprises:
        generating, using an image subtraction technique based on the two adjacent image frames, an output image indicating the identifier corresponding to the product.

5. The computer-implemented method of claim 1, wherein generating the digital representation comprises:
    generating the digital representation indicating a set of fixed inventory locations (FILs), wherein the product is stocked in one of the set of FILs.

6. The computer-implemented method of claim 1, wherein generating the digital representation comprises:
    generating the digital representation indicating the identifier corresponding to the product, a timestamp of when the additional light was detected, and a fixed inventory location (FIL) in which the product is stocked.

7. A sensor component for identifying products, comprising:
    a set of light sources configured to emit light in a frequency corresponding to an absorption frequency of a marking applied to a product;
    a band-pass filter configured to pass light having a range of frequencies;
    a digital sensor configured to sense additional light passed through the band-pass filter, wherein the additional light is emitted, in an emission frequency within the range of frequencies, by the marking applied to the product; and
    a processor interfaced with the digital sensor and configured to:

analyze the additional light detected by the digital sensor to identify an identifier corresponding to the product, and generate a digital representation of the identifier corresponding to the product, wherein the digital representation indicates a difference from a previously-generated digital representation.

8. The sensor component of claim 7, further comprising:
a transceiver interfaced with the processor and configured to:
transmit, via a network connection, at least a portion of the digital representation to a component external to the sensor component.

9. The sensor component of claim 8, wherein the processor compares the digital representation to the previously-generated digital representation to identify a difference between the digital representation and the previously-generated digital representation, and wherein the transmitter transmits at least the portion of the digital representation to the component external to the sensor component in response to the processor comparing the digital representation of the previously-generated digital representation.

10. The sensor component of claim 7, further comprising:
an oscillator configured to oscillate the set of light sources on and off;
wherein the additional light detected by the digital sensor comprises two adjacent image frames, and wherein to analyze the additional light, the processor is configured to:
generate, using an image subtraction or division technique based on the two adjacent image frames, an output image indicating the identifier corresponding to the product.

11. The sensor component of claim 7, wherein the processor generates the digital representation indicating the identifier corresponding to the product, a timestamp of when the additional light was sensed, and a fixed inventory location (FIL) in which the product is stocked.

12. A system for identifying products for sale in a store, comprising:
a sensor component configured to:
emit light in a frequency corresponding to an absorption frequency of a set of markings applied to a set of products,
detect additional light emitted, in an emission frequency, by the set of markings applied to the set of products,
analyze the additional light to identify a set of identifiers corresponding to the set of products,
generate a digital representation of the set of identifiers corresponding to the set of products, wherein the digital representation indicates a difference from a previously-generated digital representation, and
transmit at least a portion of the digital representation to a server computer; and
the server computer configured to:
receive, from the sensor component, at least the portion of the digital representation, and
determine the set of products from at least the portion of the digital representation.

13. The system of claim 12, wherein to determine the set of products, the server computer is configured to:
identify, from at least the portion of the digital representation, the set of identifiers corresponding to the set of products, and
match the set of identifiers corresponding to the set of products to a corresponding set of products included in a registry.

14. The system of claim 12, wherein the server is further configured to:
determine, based on the difference from the previously-generated digital representation, at least one additional product that has been sold in the store.

15. The system of claim 12, wherein the server computer is further configured to:
update an inventory for the store using the set of identifiers corresponding to the set of products included in the digital representation.

16. The system of claim 15, wherein the server computer is further configured to:
transmit, to a set of computing devices associated with the store, a set of information associated with the inventory for the store.

17. The system of claim 12, wherein the sensor component generates the digital representation to indicate the set of identifiers corresponding to the set of products, a timestamp of when the additional light was detected, and a set of fixed inventory location (FILs) in which the set of product is stocked.

18. The system of claim 12, wherein the additional light comprises two adjacent image frames, and wherein to analyze the additional light, the sensor component is configured to:
generate, using an image subtraction or division technique based on the two adjacent image frames, an output image indicating the set of identifiers corresponding to the set of products.

* * * * *